United States Patent
Sun et al.

(10) Patent No.: US 6,207,611 B1
(45) Date of Patent: Mar. 27, 2001

(54) CATALYST FOR HYDRODEMETALIZATION OF HEAVY OIL

(75) Inventors: Suhua Sun; Weiping Fang; Jiahuan Wang; Guolin Wu; Jianan Sun; Gang Wang; Zemin Fu; Hao Zhang; Yonglin Wang, all of Fushun (CN)

(73) Assignees: China Petro-Chemical Corporation, Beijing; Fushun Research Institute of Petroleum and Petrochemicals, SINOPEC, Fushun, both of (CN)

( * ) Notice: Subject to any disclaimer, the term of this patent is extended or adjusted under 35 U.S.C. 154(b) by 0 days.

(21) Appl. No.: 09/120,935

(22) Filed: Jul. 22, 1998

(30) Foreign Application Priority Data

Jul. 22, 1997 (CN) .......................................... CN97115112

(51) Int. Cl.$^7$ .................................................. B01J 23/00
(52) U.S. Cl. ........................ 502/325; 502/305; 502/314; 502/315; 502/321; 502/322; 502/323; 502/327; 502/335; 502/337; 502/355; 502/414; 502/415; 423/625; 423/626; 423/628; 423/630
(58) Field of Search ..................... 502/305, 313, 502/325, 337, 321, 180, 182, 185, 208, 211, 314, 315, 322, 323, 327, 335, 355, 414, 415; 423/625, 626, 628, 630

(56) References Cited

U.S. PATENT DOCUMENTS

| | | | |
|---|---|---|---|
| 3,232,887 | * | 2/1966 | Pessimisis . |
| 3,755,150 | * | 8/1973 | Mickelson .............................. 208/216 |
| 4,003,828 | * | 1/1977 | Eberly, Jr. ............................. 208/216 |
| 4,013,587 | * | 3/1977 | Fischer et al. ........................ 252/448 |
| 4,048,115 | * | 9/1977 | O'Hara ................................. 252/465 |
| 4,088,607 | * | 5/1978 | Weidenbach et al. ......... 252/466 PT |
| 4,328,127 | * | 5/1982 | Angevine et al. .................... 208/439 |
| 4,395,329 | * | 7/1983 | Le Page et al. ................. 208/216 PP |
| 4,440,631 | * | 4/1984 | Togari et al. ......................... 502/302 |
| 4,444,905 | * | 4/1984 | Pessimisis ............................ 502/211 |
| 4,448,896 | | 5/1984 | Kageyama et al. . |
| 4,508,841 | * | 4/1985 | Onuma et al. ......................... 502/73 |
| 4,588,709 | * | 5/1986 | Morales et al. ...................... 502/314 |
| 4,861,746 | * | 8/1989 | Oishi et al. .......................... 502/314 |
| 4,963,519 | * | 10/1990 | Okabayashi et al. ................. 502/63 |
| 4,975,399 | * | 12/1990 | Gardner ................................ 502/38 |
| 5,009,768 | * | 4/1991 | Galiasso et al. ...................... 208/89 |
| 5,124,302 | * | 6/1992 | Lachman et al. .................... 502/213 |
| 5,135,902 | * | 8/1992 | Delaney et al. ...................... 502/210 |
| 5,246,569 | * | 9/1993 | Heinerman et al. ............ 208/216 R |
| 5,468,709 | * | 11/1995 | Yamaguchi et al. ................. 502/210 |
| 6,037,300 | * | 3/2000 | Kasztelan et al. ................... 502/204 |

FOREIGN PATENT DOCUMENTS

| | | |
|---|---|---|
| 92112511.9 | 5/1994 | (CN) . |
| 0 237 240 | 9/1987 | (EP) . |

* cited by examiner

*Primary Examiner*—Steven P. Griffin
*Assistant Examiner*—Cam N. Nguyen
(74) *Attorney, Agent, or Firm*—Alston & Bird LLP

(57) ABSTRACT

A catalyst for hydrodemetalization of heavy oil, especially residuum oil, and a process for preparing the same, wherein said catalyst comprises the metal elements of Groups VIII and/or VIB as active components supported on an alumina carrier having large pores. The total pore volume of said carrier is in the range of 0.80~1.20 ml/g (by mercury porosimetry method), the specific surface area in the range of 110~200 m$^2$/g, the peak pore diameter in the range of 15~20 nm, and the bulk density in the range of 0.50~0.60 g/ml. In the process of the invention, a physical pore-enlarging agent and a chemical pore-enlarging agent are added simultaneously during the mixing of the pseudoboehmite to a plastic mass, then extruding, drying, calcining, the carrier is obtained, then impregnating with active components by spraying onto the carrier, after drying and calcining, the catalyst is obtained. The catalyst of the invention is suitable for the hydrodemetalization and/or hydrodesulfurization of heavy oil, particularly residuum oil.

20 Claims, No Drawings

CATALYST FOR HYDRODEMETALIZATION OF HEAVY OIL

This invention relates to a catalyst for hydrodemetalization and/or hydrodesulfurization process of heavy oil, especially residuum oil.

For the catalyst for hydrodemetalization and/or hydrodesulfurization of heavy oil, in general, alumina with larger pores is used as a carrier matrix and the metal elements of Groups VIII and/or VIB are used as active components. Commercial available alumina can be usually used only after the alumina is treated by pore-enlarging, thus pore-enlarging of the carrier alumina is one of the critical techniques for preparing the catalyst for hydrodemetalization of heavy oil.

One of conventional methods for pore-enlarging is by adding various pore-enlarging agents to the precursor of alumina—a pseudoboehmite during the kneading process.

Using carbon black as a pore-enlarging agent is proposed by U.S. Pat. No. 4,448,896, and in EP 237240, addition of carbon fibre is described to form large pores. A mechanism of pore-enlarging by both agents mentioned above is believed that the pore-enlarging agent occupies a certain volume of space in the extrude carrier particles when mixed in solid form together with the dry pseudoboehmite powder. During calcination of the carrier at high temperature, the pore-enlarging agent is converted to gas, thereby forming a certain amount of large pores. The pore-enlarging agent does not react chemically with pseudoboehmite, but only reacts physically, so it may be termed as a physical pore-enlarging agent.

In the Chinese Patent ZL 92112511.9, it is described that adding silica sol ($_2SiO_3$) in the process of kneading pseudoboehmite can have a pore-enlarging effect. Furthermore, adding simultaneously silicon (Si) and phosphorus (P) compounds to the alumina carrier can also have a pore-enlarging effect, especially the pore-enlarging effect of phosphorus compounds is more significant. The pore-enlarging agent reacts chemically with pseudoboehmite, so it may be termed as a chemical pore-enlarging agent.

Disadvantages of the carrier and catalyst which are prepared by using solely the physical pore-enlarging agent are: (1) scattered pore distribution; (2) obviously decreased mechanical strength and bulk density. For example, a catalyst prepared by U.S. Pat. No. 4,448,896 has the peak pore diameter of 14.2 nm, the total pore volume of 0.848 ml/g, and the pore volume of pores having pore diameters of 7.5~20.0 nm is about 60% of the total pore volume; and the mechanical strength is low, only about 2.3 N/mm. A catalyst of EP 237240 has an average pore diameter in the range of 7.5~20.0 nm, the total pore volume of 0.60 ml/g, with the pore volume of pores having pore diameters of 5.0~40.0 nm being about 65% of the total pore volume. When its mechanical strength is too low a catalyst will not meet the requirements of industrial application; And if a catalyst having scattered pore distribution and decreased bulk density, the effective inner surface area of the packed catalyst per unit volume will be decreased, and consequently the activity of the catalyst corresponding to the volume space velocity will be decreased.

Using solely a chemical pore-enlarging agent will make the peptizing property of the pseudoboehmite become worse, thereby causing difficulties in the extrusion of the carrier. Furthermore, when a large amount of the chemical pore-enlarging agent is used, the pore distribution of the catalyst prepared will be more scattered.

In brief, when any one of the two pore-enlarging agents is solely used, its amount used will be restricted to a certain extent. Thus, its pore-enlarging effect is very limited, and it is hardly possible to prepare a catalyst carrier having large pores, concentrated pore distribution, and appropriate mechanical strength and bulk density. Especially, if the method for pore-enlarging is not appropriate, it will result in a scattered pore distribution and cause the efficiency of the catalyst to decrease greatly.

In view of the above-mentioned problems, an object of this invention is to invent a catalyst for hydrodemetalization of heavy oil, especially residuum oil, which has larger pore volume and pore diameters, concentrated pore distribution, appropriate mechanical strength and bulk density, especially good demetalization and desulfurization activities, and good stability of the activity. Another object of the invention is to provide a method for preparing a catalyst having good physical and chemical properties for hydrodemetalization of heavy oil, especially residuum oil.

The catalyst of the invention, using the large pore alumina as a carrier, on which the metal elements of Groups VII and/or VIB are supported has a total pore volume of about 0.70~0.90 ml/g, a specific surface area of about 110~200 $m^2/g$, the peak pore diameter of 15~20 nm, with the pore volume of pores having pore diameters of 10~20 nm being over 60% of the total pore volume. Its mechanical strength is $\geq 7.5$ N/mm. The carrier contains $P_2O_5$ in an amount of 0.07~1.10 wt %

In the catalyst of the invention, $MoO_3$ or $WO_3$ is in an amount of 6.0~14.0 wt %, preferably 8.0~12.0 wt %; CoO or NiO in an amount of 2.0~6.0 wt %, preferably 2.5~3.5 wt %, and a carrier in an amount of 80~90 wt %, on the basis of the weight of the catalyts.

A technological gist of the invention is that two different types of the pore-enlarging agents, i.e., a physical pore-enlarging agent and a chemical pore-enlarging agent, are added simultaneously while mixing the the pseudoboehmite powder and water or aqueous solution.

The physical pore-enlarging agents are generally flammable solid particulates, of which the pore-enlarging principle involves that after the solid particulates and the the pseudoboehmite powder are mixed homogenously and extruded to bar under the effect of water or aqueous solution, the bars are calcined at a high temperature in oxygen-containing atmosphere, in the course of calcination the physical pore-enlarging agent is converted to gas and escapes therefrom, and a certain volume of large pores is left, so large numbers of the enlarged pores are formed in the bar alumina carrier resulted from calcination. The pore sizes in the carrier which has been treated by pore-enlarging depend on various factors such as the type of the physical pore-enlarging agent used and the like.

The chemical pore-enlarging agents are generally inorganic compounds capable of reacting with alumina and its precursors, such as phosphorus, silicon and boron compounds etc. The pore-enlarging principle of the chemical pore-enlarging agents involves that under the surface chemical reaction between the inorganic compounds as a pore-enlarging agent and the pseudoboehmite the bond between particles of the pseudoboehmite powder is weakened and then void space between each other become larger, thus parts of large pores are formed.

When either a physical or a chemical pore-enlarging agent is solely used, it is often used in a larger amount so as to achieve the desired results, thus its negative effect (disadvantages) is also revealed more apparently.

The process of preparing the catalyst of the invention comprises:

(1) weighing a given amount of the dry pseudoboehmite powder, a physical pore-enlarging agent (in an amount of 3~10 wt % based on the weight of alumina) and extruding aids, mixing them homogenously, then adding the aqueous solution of a chemical pore-enlarging agent (when it is a phosphorus compound, its amount added is in the range of 0.1~1.5 wt % based on the weight of alumina), after mixing homogenously, a plastic mass being formed;

(2) extruding the resultant material from the step (1) in an extruder;

(3) drying the resultant bars from the step (2) at 90~150° C. for 2~8 hours or drying it in the open;

(4) calcining the resultant bars from the step (3) at 840~1000° C. for 1~5 hours;

(5) impregnating the resultant bars from the step (4) by spraying with the solution containing Ni or/and Mo compound;

(6) drying the resultant material from the step (5) at 80~140° C. for 1~5 hours, or drying in the open;

(7) calcining the resultant material from the step (6) at 500~600° C. for 1~5 hours;

wherein said physical pore-enlarging agent used in the step (1) is carbon black, and said chemical pore-enlarging agent is phosphoric acid, phosphate and boric acid and the like;

wherein said impregnating solution used in the step (5) is one selected from the group consisting of Mo—Ni, Mo—Co,W—Ni and Ni solution;

wherein said extruding aids used in the step (1) are sesban powder, starch, polyvinyl alcohol, and methyl cellulose, most preferably sesban powder; and wherein a hole plate of the extruder for said extrusion process in the step (2) is selected according to requirement, and the shape of the carrier is cylindrical or clover bar, in a diameter or equivalent diameter of 0.8~4.8 mm.

Alumina with large pore diameters is used as the carrier of the catalyst of the invention, on which metal elements of Groups VIII and/or VIB are supported, pore volume of the catalyst is in the range of 0.70~0.90 ml/g, specific surface area is in the range of 110~200 $M^2$/g, the peak pore diameter is in the range of 15~20 nm, the pore volume of pores having pore diameters of 10~20 nm is at least 60% of the total pore volume, the mechanical strength is $\geq$,7.5 N/mm, and the carrier contains $P_2O_5$ in an amount of 0.07~1.10 wt %. In the catalyst of the invention, based on the weight of the catalyst, $MoO_3$ or $WO_3$ is in the range of 6.0~14.0 wt %, preferably 8.0~12.0 wt %; CoO or NiO in the range of 2.0~6.0 wt %, preferably 2.5~3.5 wt %, and a carrier in the range of 80~90 wt %.

The sulfurized catalyst of the invention exhibits good demetalization and desulfurization activities in treating heavy oil, especially residuum oil, with the existence of hydrogenation.

In the invention, it is proposed to use simultaneously a physical pore-enlarging agent and a chemical pore-enlarging agent, so that the two can perform simultaneously the pore-enlarging actions, which will not only save the respective amounts of the two pore enlarging agents used, but also offset their respective negative effects, while achieving significant effect in pore-enlarging to produce an alumina carrier having concentrated pore distribution and a catalyst having good properties for the hydrodemetalization of heavy oil. The advantages of this process for pore-enlarging can be summarized as follows: (1) it is simple and easy to operate and master for no additional step is required; (2) the desired pore diameters of alumina can be obtained according to requirements by adjusting the added amounts of the two pore-enlarging agents and calcining temperature; (3) the properties of the product can be controlled effectively by using simultaneously two kinds of the pore-enlarging agents, the restriction on the precursors of alumina can be relaxed, and the production cost can be reduced. The features of the alumina carrier prepared according to the invention are: (1) the pore diameters and pore volume are larger, and the pore distribution is concentrated; (2) the mechanical strength and bulk density are moderate because no excessive amount of the physical pore-enlarging agent is added. The catalyst prepared with said carrier has good activity and stability for demetalization and desulfurization. The invention is described in detail in association with the examples as follows:

EXAMPLE 1

Weighing the dry pseudoboehmite powder 300 g (containing water 78 g) which was prepared with carbon dioxide and sodium metaaluminate, (manufactured by the Qi Lu Petro-Chemical Corp., China), and carbon black 18 g with a particle size of 30 micrometer (produced by the Fu Shun Carbon Black Factory, China), and sesban powder as extruding aids 10 g, mixing homogeneously, adding a solution prepared by using 2.0 g phosphoric acid and 400 g water ($H_2O$), kneading them to a plastic mass and extruding it in an extruder to $\phi$0.9 mm bar, then drying at a temperature of 120° C. for 4 hours, and calcining at 900° C. for 2 hours, thereby carrier A was obtained, then impregnating the carrier A with a Mo—Ni—$NH_3$ solution containing $MoO_3$ 12.0 wt % and NiO 4.0 wt %, and drying at 100° C. for 4 hours and calcining at 500° C. for 2 hours, finally catalyst $A_1$ was obtained.

EXAMPLE 2

As the example 1, except for that phosphoric acid was 1.0 g instead of 2.0 g, thus being this example, carrier B was obtained, then catalyst $B_1$ was obtained.

EXAMPLE 3

As the example 1, except for that carbon black was 11 g instead of 18 g, thus being this example, carrier C was obtained, then catalyst $C_1$ was obtained.

EXAMPLE 4

As the example 1, except for that the calcining temperature of the carrier was at 960° C. instead, thus being his example, carrier D was obtained, then catalyst $D_1$ was obtained.

EXAMPLE 5

As the example 1, except for that the calcining temperature of the carrier was at 850° C. instead, thus being this example, carrier E was obtained, then catalyst $E_1$ was obtained.

EXAMPLE 6

As the example 1, except for that the dry pseudoboehmite powder was prepared with aqueous ammonia and aluminium trichloride by the Fu Shun No. 3 Oil Refinery instead, thus being this example, carrier F was obtained, then catalyst $F_1$ was obtained.

Comparative Example 1

As the example 1, except for that carbon black was 60 g instead of 18 g, and water was 380 g instead of 400 g, and 10 g glacial acetic acid was used instead of 2.0 g phosphoric acid, thus being this comparative example, carrier G was obtained, then catalyst $G_1$ was obtained.

Comparative Example 2

As the example 1, except that no carbon black was used, and water was 380 g instead of 400 g, and phosphoric acid was 6.0 g instead of 2.0 g, and furthermore, 15 g glacial acetic acid was added, thus being this comparative example, carrier H was obtained, then catalyst $H_1$ was obtained.

EXAMPLE 7

In this example, the physical and chemical properties of the carriers and catalysts prepared by the examples and comparative examples given above are shown in the Table 1 and Table 2.

the bulk density is >0.52 g/ml, the crushed strength is >7.5 N/mm, the pore volume is >0.85 ml/g, and the specific surface area is >148 $m^2/g$, and the peak pore diameter is >16 nm, and it is suitable for use as a carrier of the catalyst for the demetalization and desulfurization of heavy oil and/or residuum oil.

It is shown in Table 2 that all the catalysts $A_1$, $B_1$, $C_1$, $D_1$, $E_1$, and $F_1$ of the invention have larger pore diameters, concentrated pore distribution, and moderate bulk density and crushed strength. This is due to lower content of active metals in the catalyst of the invention, consequently these properties of the catalyst are essentially determined by the properties of the carrier.

TABLE 1

Physical and Chemical Properties of Different Alumina Carriers

| Items | A | B | C | D | E | F | G | H |
|---|---|---|---|---|---|---|---|---|
| Bulk density, g/ml | 0.52 | 0.54 | 0.53 | 0.54 | 0.52 | 0.53 | 0.41 | 0.47 |
| Crushed strength, N/mm | 7.6 | 8.4 | 8.5 | 8.2 | 7.9 | 8.2 | 4.6 | 5.4 |
| Pore volume, ml/g (by mercury porosimetry method) | 1.00 | 0.90 | 0.86 | 0.85 | 0.98 | 0.92 | 1.08 | 1.05 |
| Specific surface area, $m^2/g$ | 162 | 157 | 160 | 148 | 159 | 160 | 177 | 168 |
| Peak pore diameter, nm | 17 | 16 | 17 | 18 | 16 | 17 | 13~20 | 14~18 |
| Pore distribution, % | | | | | | | | |
| <10 nm | 13 | 12 | 14 | 11 | 16 | 13 | 25 | 23 |
| 10~20 nm | 60 | 70 | 67 | 65 | 61 | 68 | 44 | 49 |
| >20 nm | 27 | 18 | 19 | 24 | 23 | 19 | 31 | 28 |

TABLE 2

Physical and Chemical Properties of The Catalysts

| Items | $A_1$ | $B_1$ | $C_1$ | $D_1$ | $E_1$ | $F_1$ | $G_1$ | $H_1$ |
|---|---|---|---|---|---|---|---|---|
| Bulk density, g/ml | 0.62 | 0.63 | 0.63 | 0.64 | 0.61 | 0.63 | 0.48 | 0.57 |
| Crushed strength, N/mm | 7.8 | 8.4 | 8.2 | 8.0 | 7.5 | 7.6 | 4.9 | 5.6 |
| Pore volume, ml/g (by mercury porosimetry method) | 0.84 | 0.76 | 0.72 | 0.73 | 0.82 | 0.85 | 0.86 | 0.88 |
| Specific surface area, $m^2/g$ | 155 | 146 | 149 | 138 | 150 | 154 | 163 | 158 |
| Peak pore diameter, nm | 17 | 17 | 16 | 18 | 16 | 17 | 13~20 | 14~18 |
| Pore distribution, % | | | | | | | | |
| <10 nm | 13 | 12 | 14 | 11 | 16 | 12 | 24 | 23 |
| 10~20 nm | 61 | 70 | 68 | 65 | 60 | 68 | 45 | 49 |
| >20 nm | 26 | 18 | 18 | 24 | 24 | 20 | 31 | 28 |
| $MoO_3$, wt % | 8.60 | 8.43 | 8.71 | 9.10 | 8.57 | 8.80 | 8.84 | 8.56 |
| NiO, wt % | 2.45 | 2.51 | 2.60 | 2.54 | 2.42 | 2.70 | 2.61 | 2.65 |

It can be seen from the data shown in Table 1 that, in spite of a large amount of a single kind of pore-enlarging agent was used in the comparative examples 1 and 2, the pore volume of pores having pore diameters of 10~20 nm in the prepared carrier was only 44~49%, the bulk density was <0.47 g/ml, the crushed strength (mechanical strength) was <5.4 N/mm. The carrier prepared according to this invention has highly concentrated pore distribution, the pore volume of pores having pore diameter of 10~20 nm is 60~70%, and

EXAMPLE 8

Under the same evaluation conditions, the behaviours of demetalization (Ni+V) and desulfurization of the catalysts in the above-said examples were compared. The feedstock oil evaluated was a vacuum residuum oil from the Gu Dao crude oils. Its properties and evaluation conditions are shown in Table 3 and Table 4, and the evaluation results are shown in Table 5.

TABLE 3

Properties of Feedstock Oil

| | | |
|---|---|---|
| Density (20° C.), | g/cm³ | 0.9940 |
| S, | wt % | 2.51 |
| Ni/V, | μg/g | 38/4.9 |

TABLE 4

Evaluation Conditions

| | |
|---|---|
| Pressure, MPa | 14.7 |
| Temperature, ° C. | 380 |
| Space velocity, h$^{-1}$ | 1.25 |
| Ratio of Hydrogen/Oil, (v/v) | 1000 |

TABLE 5

Results of Activity Evaluation

| Items | $A_1$ | $B_1$ | $C_1$ | $D_1$ | $E_1$ | $F_1$ | $G_1$ | $H_1$ |
|---|---|---|---|---|---|---|---|---|
| Desulfurization rate, % | 51 | 50 | 52 | 50 | 49 | 52 | 45 | 45 |
| De(Ni + V) rate, % | 48 | 49 | 49 | 48 | 48 | 49 | 42 | 42 |

It is shown in Table 5 that the catalyst of the invention has higher demetalization and desulfurization activities.

What is claimed is:

1. A process for preparing an alumina carrier for supporting a catalyst for heavy oil hydrodemetalization comprising:
   providing a mixture including pseudoboehmite, carbon black, and a phosphorus containing compound;
   extruding the mixture to form an extrudate; and
   drying and calcining the extrudate to form the alumina carrier, wherein the carbon black in said mixture is at an amount of from 3% to 10% by weight based on the weight of the pseudoboehmite alumina, and wherein the phosphorus-containing compound is at an amount such that said alumina carrier contains $P_2O_5$ at an amount of 0.07 to 1.10% by weight based on the total weight of the alumina carrier.

2. The process of claim 1, wherein the carbon black in said mixture is at an amount of from 3% to 6% by weight based on the weight of the pseudoboehmite alumina.

3. The process of claim 1, wherein the phosphorus-containing compound is selected from the group consisting of phosphoric acid, ammonium hydrogen phosphate, ammonium dihydrogen phosphate, and ammonium phosphate.

4. The process of claim 3, wherein the phosphorus-containing compound is phosphoric acid at an amount of 0.1% to 0.67% by weight based on the weight of the pseudoboehmite alumina.

5. The process of claim 3, wherein the phosphorus-containing compound is phosphoric acid at an amount of 0.1% to 0.33% by weight based on the weight of the pseudoboehmite alumina.

6. The process of claim 1, wherein the carbon black is in particulates having a particle size of 25 to 40 micrometers.

7. The process of claim 1, wherein the extrudate is calcined at a temperature of from about 840° C. to about 1000° C..

8. A process for preparing a catalyst for heavy oil hydrodemetalization comprising:
   providing a mixture including pseudoboehmite, carbon black, and a phosphorus-containing compound;
   extruding the mixture to form an extrudate;
   drying and calcining the extrudate to form an alumina carrier, wherein the carbon black in said mixture is at an amount of from 3% to 10% by weight based on the weight of the pseudoboehmite alumina, and wherein the phosphorus-containing compound is at an amount such that said alumina carrier contains $P_2O_5$ at an amount of 0.07 to 1.10% by weight based on the total weight of the alumina carrier;
   impregnating said alumina carrier with a solution containing a compound of a group VIII element and optionally a compound of a group VIB element; and
   drying and calcining the impregnated alumina carrier to form the catalyst.

9. The process of claim 8, wherein the group VIII element is Co or Ni.

10. The process of claim 8, wherein the group VIB element is W or Mo.

11. The process of claim 8, wherein the solution contains $MoO_3$ or $WO_3$ at an amount of 6.0 to 14.0 wt % based on the total weight of the catalyst, and optionally CoO or NiO at an amount of 2.0 to 6.0 wt % based on the total weight of the catalyst.

12. The process of claim 8, wherein the carbon black in said mixture is at an amount of from 3% to 6% by weight based on the weight of the pseudoboehmite alumina.

13. The process of claim 8, wherein the phosphorus-containing compound is selected from the group consisting of phosphoric acid, ammonium hydrogen phosphate, ammonium dihydrogen phosphate, and ammonium phosphate.

14. The process of claim 13, wherein the phosphorus-containing compound is phosphoric acid at an amount of 0.1% to 0.67% by weight based on the weight of the pseudoboehmite alumina.

15. The process of claim 13, wherein the phosphorus-containing compound is phosphoric acid at an amount of 0.1% to 0.33% by weight based on the weight of the pseudoboehmite alumina.

16. The process of claim 8, wherein the carbon black is in particulates having a particle size of 25 to 40 micrometers.

17. The process of claim 8, wherein the extrudate is calcined at a temperature of from about 840° C. to about 1000° C..

18. The process of claim 8, wherein the impregnated alumina carrier is calcined at a temperature of 500 to 600° C..

19. The process of claim 8, wherein said catalyst has a bulk density of at least 0.61 gram/ml and a crush strength of at least 7.5 N/mm.

20. The process of claim 8, wherein said catalyst has a pore volume in the range of 0.70 to 0.90 ml/g, a specific surface area in the range of 110 to 200 m²/g, a peak pore diameter in the range of 15 to 20 nm, and a combined pore volume of pores having pore diameters of 10 to 20 nm of over 60% of the total pore volume.

* * * * *